(12) United States Patent
Clarke et al.

(10) Patent No.: US 7,835,397 B2
(45) Date of Patent: Nov. 16, 2010

(54) FRAME PROCESSING

(75) Inventors: Michael J. Clarke, Headington (GB); William James Lockhart, Cambridge (GB); Martin R. Lea, Chalfont St. Peters (GB); Mark A. French, Amersham (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1426 days.

(21) Appl. No.: 10/831,719

(22) Filed: Apr. 23, 2004

(65) Prior Publication Data
US 2004/0213284 A1 Oct. 28, 2004

Related U.S. Application Data

(60) Provisional application No. 60/465,507, filed on Apr. 25, 2003.

(51) Int. Cl.
H04J 3/24 (2006.01)
(52) U.S. Cl. ............... 370/474; 370/475; 370/476; 710/267
(58) Field of Classification Search ........... 370/389, 370/392, 395.1, 400, 401, 357, 365, 382, 370/386–390, 412, 415, 426, 474–476; 710/3–5, 710/22, 42, 105–106, 260–269
See application file for complete search history.

(56) References Cited

U.S. PATENT DOCUMENTS

| | | | |
|---|---|---|---|
| 6,032,190 A * | 2/2000 | Bremer et al. ............... 709/238 |
| 6,272,134 B1 * | 8/2001 | Bass et al. ................... 370/390 |
| 6,393,026 B1 * | 5/2002 | Irwin ........................ 370/401 |
| 6,724,761 B1 * | 4/2004 | Moy-Yee et al. ............ 370/390 |
| 7,103,038 B1 * | 9/2006 | Gaudet ...................... 370/366 |
| 7,406,096 B2 * | 7/2008 | El-Maleh et al. ............ 370/474 |
| 2001/0017858 A1 * | 8/2001 | Kamoi et al. ................ 370/394 |
| 2001/0033575 A1 * | 10/2001 | Shimamura et al. ......... 370/419 |
| 2002/0009082 A1 * | 1/2002 | Matsuoka et al. ........... 370/390 |
| 2002/0031092 A1 * | 3/2002 | Wakabayashi et al. ...... 370/249 |
| 2002/0196778 A1 * | 12/2002 | Colmant et al. ............. 370/352 |
| 2005/0175025 A1 * | 8/2005 | Beadle et al. ............... 370/432 |

FOREIGN PATENT DOCUMENTS

JP 07193616 A * 7/1995

* cited by examiner

Primary Examiner—Kwang B Yao
Assistant Examiner—Jeffrey M Rutkowski
(74) Attorney, Agent, or Firm—Van Pelt, Yi & James, LLP

(57) ABSTRACT

A technique is disclosed for generating a plurality of output frames based on a single input frame. An input interface is configured to receive at least a portion of the input frame. An output controller is configured to receive, for each of the plurality of output frames, a new header, and combine each new header with at least a portion of the input frame. An output frame may be generated for which no corresponding input frame exists. An input interface is configured to receive an indication that the output frame should be generated. An output controller is configured to receive a generated header and combine the generated header with a dummy payload to form the output frame.

23 Claims, 7 Drawing Sheets

FRAME PROCESSING

CROSS REFERENCE TO RELATED APPLICATIONS

This application claims priority to U.S. Provisional Patent Application No. 60/465,507 entitled NETWORK PACKET PROCESSOR filed Apr. 25, 2003 which is incorporated herein by reference for all purposes.

FIELD OF THE INVENTION

The present invention relates generally to data networks. More specifically, processing data frames is disclosed.

BACKGROUND OF THE INVENTION

Computer networks rely on switches to forward frames between various nodes in a network. As used herein, a frame refers to any discrete bundle of data switched through a network, such as an Ethernet packet or ATM frame. A switch typically receives a frame as input at an ingress port and provides the frame as output to an egress port associated with a destination to which the frame is addressed. The output frame is not necessarily the same as the input frame. For example, the switch may modify the header of the frame or encapsulate the frame for purposes of tunneling. The frame may need to be replicated and sent to multiple destinations with different headers. Typically, the replication process requires generating an identical copy of the frame for each destination, which can be inefficient and inflexible in hardware. Also, it may be desirable for a frame, such as a control frame, to be generated without a corresponding input frame, a capability not provided by current systems. There is a need for a more efficient and flexible way to generate and replicate frames in a switch.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

When a switch receives an input frame, it may be necessary to generate multiple unique output frames based on that input frame. Generating replicated frames by storing a portion of an input frame, generating multiple unique headers, and combining the headers with the stored portion is disclosed. Generating an output frame without a corresponding input frame also is disclosed. For example, a control frame may be generated by combining a control header with a dummy payload.

Figure 1:
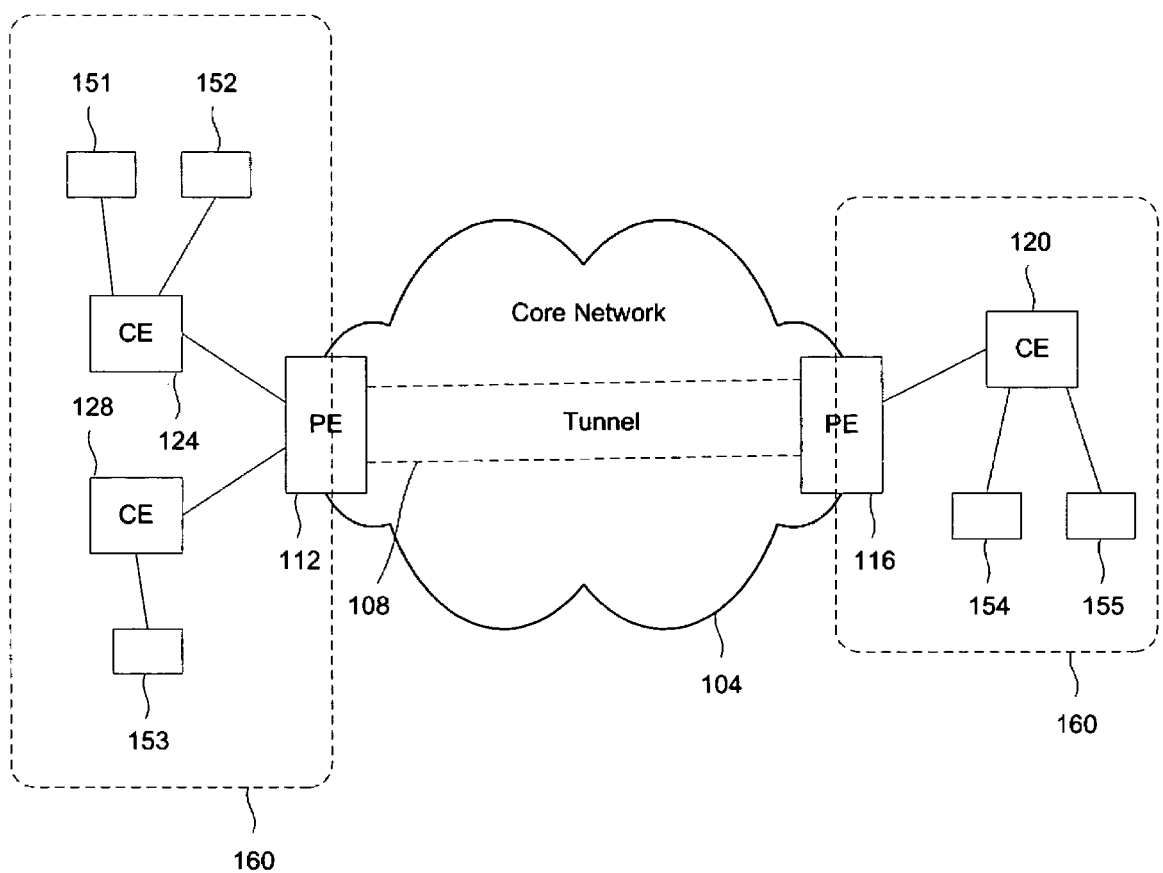
FIG. 1 is a block diagram illustrating a VLAN separated by a core network.

Applications that may use frame replication and generation include virtual local area networks (VLAN). A VLAN allows devices to communicate as if they are on the same network even though they may be on separate physical networks. FIG. 1 is a block diagram illustrating a VLAN 160 separated by a core network 104. In this example, Customer edge (CE) device 124, CE device 128, and CE device 120 are each connected to one or more customer nodes. A customer node can be a PC, workstation, or other network device. CE device 124 connects nodes 151 and 152 with provider edge (PE) device 112, CE device 128 connects node 153 with PE device 112, and CE device 120 connects nodes 154-155 with PE device 116. PE device 112 and PE device 116 are connected to core network 104. CE devices 120, 124, and 128 and PE devices 112 and 116 may comprise switches, routers, or any other type of network equipment or device configured to process and route network data as described herein.

CE device 124, CE device 128, CE device 120, and customer nodes 151-155 are part of VLAN 160. CE device 124, CE device 128, and customer nodes 151-153 are in a separate physical/geographic location than CE device 120 and customer nodes 154-155, but the two portions comprising VLAN 160 are connected by tunnel 108 through core network 104. Core network 104 and VLAN 160 are separate networks and may use different protocols. Frames sent between nodes 151-153 and nodes 154-155 may be tunneled through core network 104 via tunnel 108 using an encapsulating protocol such as Multi Protocol Label Switching (MPLS) or Generic Routing Encapsulation (GRE). For example, when node 154 sends a frame to node 152, PE device 116 receives the frame via CE device 120 and encapsulates the frame with a new header as it enters core network 104. The new header is compatible with the protocol used in core network 104, and the frame is switched through core network 104 to PE device 112. At PE device 112, the new header is removed before sending the frame to node 152 via CE device 124.

In some embodiments, PE devices 112 and 116 include a processing chip to generate new frames. For example, in the case a multicast frame sent on VLAN 160, in some embodiments PE devices 112 and 116 are configured to receive the multicast frame, recognize that the frame must be replicated and sent to multiple destinations, produce the required copies of the frame, and send each copy to its corresponding destination. In some cases, one or more of the required copies may need to be different than the original frame, e.g., to accommodate different communication protocols and mechanisms, multiple applications, or other differences in configuration of the respective destinations and/or the intervening networks and equipment.

Figure 2A:
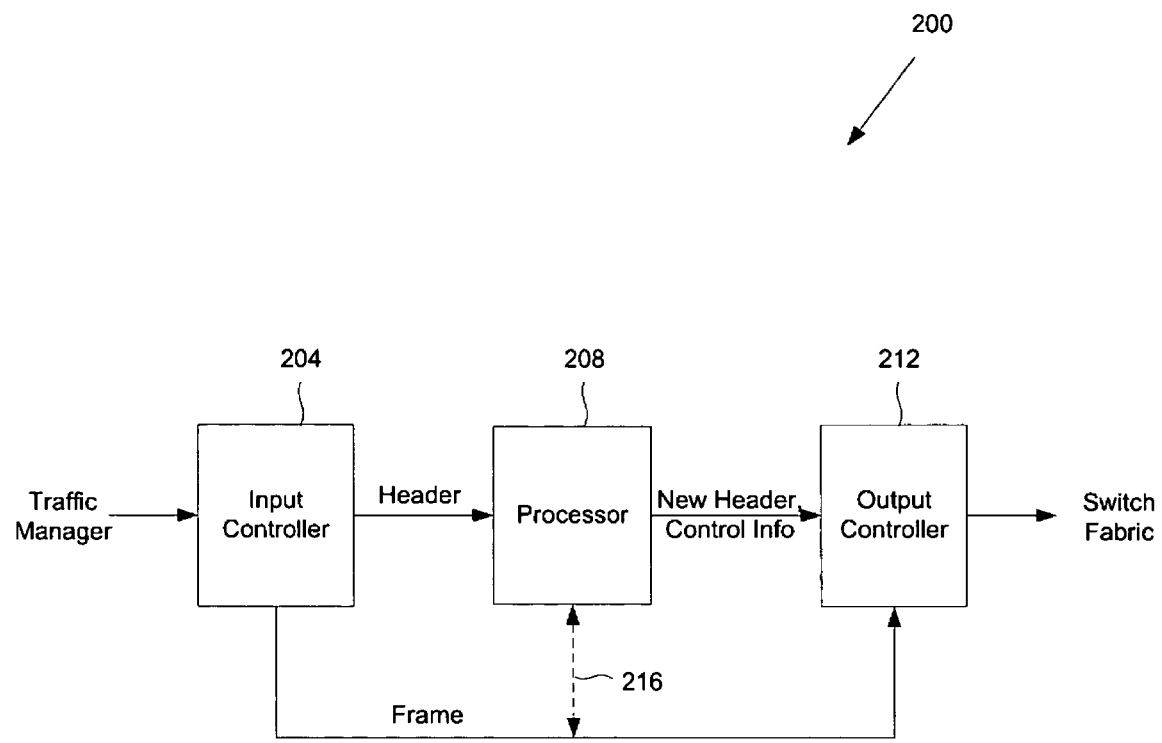
FIG. 2A is a block diagram illustrating a processing chip used in some embodiments in a switch such as a PE device.

FIG. 2A is a block diagram illustrating a processing chip 200 used in some embodiments in a switch such as PE device 112. A traffic manager device or module preprocesses frames before providing them to input controller 204. For example, the traffic manager may perform various queuing tasks, including reassembling and ordering frames. In other embodiments, the frames may be received from a device or source other than a traffic manager device, and other, further, different, or no pre-processing may be performed prior to frames being provided as input to the packet/frame processor.

Input controller 204 stores a portion of the frame, such as the frame payload, in an input buffer. Alternatively, the entire frame may be stored. Input controller 204 provides the frame header as input to processor 208. In some embodiments, processor 208 comprises an array of processors configured to process frames in parallel. In some embodiments, processor 208 comprises an array of processor chains, each chain comprising two or more stages, with part of the required processing being completed by each stage in the chain. Processor 208 generates a new header and control information to provide as input to output controller 212. In some embodiments, the control information comprises information indicating the length of the new header, a start byte indicating where the frame (or the payload portion thereof) begins in the input buffer and an end byte indicating where the frame ends in the input buffer. Processor 208 may also read the stored frame from input controller 204 for deep packet processing, e.g., application layer processing, as shown by optional data path 216. Output controller 212 receives the stored frame (or at least the body or payload portion thereof) from input controller 204 based on the control information. The new header and the stored frame are combined by the output controller 212. For example, the new header may be appended to the stored frame to form a new frame. The original header is not necessarily included in the new frame. For example, the new header may be appended to just the payload portion of the stored frame. The new header may be of any length. In some embodiments, the new header comprises at least a portion of the payload. For example, the new header may include the payload of the new frame. In some embodiments, processor 208 may be configured to generate both a new header and all or part of the corresponding payload, and to pass both the new header and the payload (or portion thereof) to output controller 212. The new frame is provided as output to a traffic manager or a switch fabric access device or module configured to send the frame to a switch fabric. In one embodiment, the new frame is provided as input to the queuing chip referred to above.

Replicated frames can be generated based on a single input frame. For example, in a Transparent LAN Service (TLS), replicated frames may be generated to broadcast a frame, i.e., send it to more than one destination. The replicated frames may have the same payload and different headers each indicating a different port, for example, or each suitable for one of a plurality of different communication, tunneling, or transport protocols. Processor 208 generates multiple new headers and provides them to output controller 212. Each of the new headers is then combined with the original frame to generate the replicated frames.

One or more output frames can be generated where no corresponding input frame is available. Processor 208 generates an appropriate new header. In some embodiments, the new header may be generated in response to a message, command, or indication received via input controller 204. Output controller 212 combines the new header and a dummy payload or null payload to form the output frame. In some embodiments, a zero length frame is shifted into the processor 208 at intervals, e.g., as indicated by a synchronization scheme, if no input frames are available to be shifted into the processor, thereby create opportunities for output frames to be generated with no corresponding input frame.

Figure 2B:
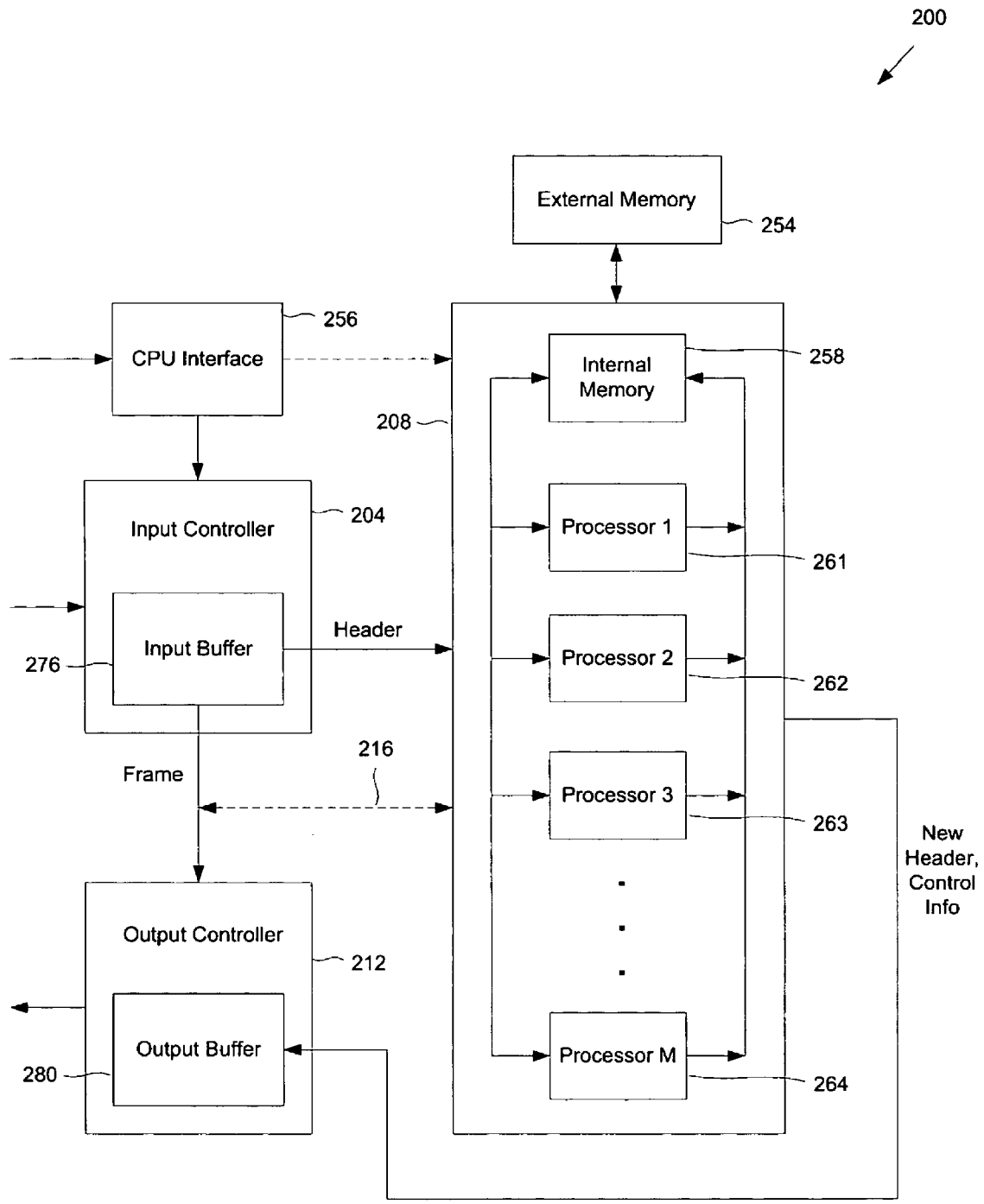
FIG. 2B is a block diagram illustrating processing chip in greater detail.

FIG. 2B is a block diagram illustrating processing chip 200 in greater detail. Input controller 204 is shown to include input buffer 276 to store received frames or portions of frames, such as payloads. Input buffer 276 may be any appropriate memory internal or external to the chip. In some embodiments, input buffer 276 is a circular buffer. If the buffer nears its maximum depth, flow control is asserted at the input in order to prevent more data from being received. Headers are provided as input to processor 208 from input buffer 276. For example, headers may be read from input buffer 276 or sent from input buffer 276 to processor 208.

Processor 208 is shown to include internal memory 258 and an array of M processors 261-264. Processors 261-264 process headers provided by input buffer 276 in parallel. For example, a stream of headers from input buffer 276 may be fed into processors 261-264 in a round robin fashion. The headers are fed to processors 261-264 in order, where each processor receives one header to process. The first header is provided to processor 261, the next header is provided to processor 262, and so forth. In some embodiments, frame order is maintained by ensuring that output frames are generated by the processors of the array in the same order in which they enter the array.

Processor 208 generates new headers. Any one of processors 261-264 may access memory internal or external to the chip, such as internal memory 258 or external memory 254, during processing. For example, external memory 254 may contain information that is used to generate a new header. Internal memory 258 and external memory 254 each may comprise more than one memory device, area, or structure. The frames stored in the input buffer may in some embodiments be accessed during processing, as shown by optional data path 216. For example, the frame contents may affect policy, priority, or security information that is used to generate a new header. New headers are provided as output from processor 208. In addition, control information, as described further below, is provided as output from processor 208.

Output controller 212 is shown to include output buffer 280 to store the new headers and control information received from processor 208. Output buffer 280 may be any appropriate memory internal or external to the chip. In some embodiments, output buffer 280 is a circular buffer. New headers and control information may be written to output buffer 280 from processor 208 in a round robin fashion. Each processor generates one or more new headers for the frame it is processing, and the new headers are written to output buffer 280 in the same order in which the corresponding original frame headers were fed into the array of processors 1 to M. For example, assuming frames are fed into processor 208 by first feeding a received frame header to processor 261, then one to processor 262, and so forth, and assuming no frames are multicast frames, the processors would process the respective frames fed to them, and then once all were ready processor 261 would write its new header and control information to the output buffer, followed by processor 262, and so on. In some embodiments, if a multicast frame is received, order is maintained by allowing the processor that is processing the multicast frame to output multiple, in some cases unique, headers for the same frame, without any new headers being output by other processors of the array, and then permitting the next processor in order to output one or more new headers for the frame it is processing, and so on.

Output controller 212 combines each new header in output buffer 280 with the original frame (or at least a payload or body portion thereof) from which it was generated. The original frames (or a portion thereof) are stored in input buffer 276. For each new header written to the output buffer 280, the location of the corresponding original frame in input buffer 276 is provided by the control information associated with the new header. For example, the control information may be included in a control word associated with each new header. In some embodiments, the control information may comprise start byte information and end byte information associated with the location of the original frame in the input buffer.

As noted, based on a single input frame, multiple new headers may be generated and stored in output buffer 280. The same control information regarding the location of the original frame in the input buffer may be associated with each of the new headers. Each new header is combined with the same original frame to generate multiple unique output frames.

CPU interface 256 is an interface to an off chip CPU for the purpose of receiving commands. For example, the off chip CPU may send an instruction to input controller 204 to generate a control frame. Processor 208 generates an appropriate new header based on an instruction from input controller 204 or directly from CPU interface 256. Output controller 212 combines the new header and a dummy payload into a control frame. In some embodiments, in response to receiving via CPU interface 256 a command to generate a control frame the input controller 204 stores control information associated with a zero length frame in input buffer 276. This zero length frame becomes the dummy payload combined by output controller 212 with the control frame header generated by the processor 208 to form the control frame. In some embodiments, the control frame header may comprise control information used by a downstream device, system, process, or user, to perform some control function, such as an operations, administration, or maintenance function. While a control frame is described as being generated, the approach described herein may be used to generate a frame of any type desired even when no corresponding input frame is available.

Figure 3:
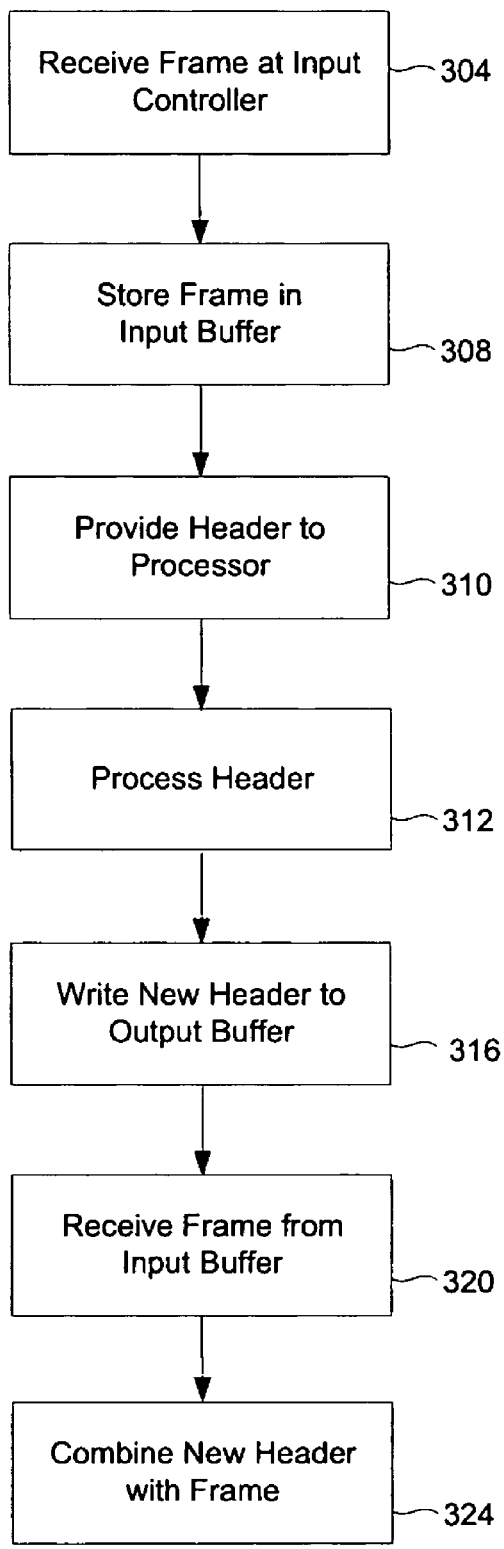
FIG. 3 is a flowchart illustrating a method used in one embodiment to process a frame in a processing chip.

FIG. 3 is a flowchart illustrating a method used in one embodiment to process a frame in a processing chip, such as processing chip 200. In one embodiment, steps 304-308 are performed by input controller 204, steps 310-316 are performed by processor 208, and steps 320-324 are performed by output controller 212.

In this example, a frame is received at an input controller (304). In one embodiment, if no frame is received within a given period, a dummy frame or null frame is generated by the input controller or off chip. In one embodiment, a dummy or null frame is generated, and/or control information associated with a zero length frame is generated, in response to receiving a command on an external interface, such as CPU interface 256 of FIG. 2. The frame is stored in an input buffer (308). Alternatively, a portion of the frame, such as the payload, may be stored in the input buffer. The header is provided to a processor (310). The header is processed (312). Processing may include reading data from the header, reading data from internal or external memory based on data in the header, or executing software or processing based on or using header data, external data, or internal data. A new header is written to an output buffer (316). Alternatively, the new header is sent to the output buffer, for example, in a message. Control information that indicates the location of the corresponding original frame in the input buffer is written to the output buffer. In one embodiment, a control word is written to the output buffer. The control word includes the new header length, the start byte offset of the frame in the input buffer and the end byte offset of the frame in the input buffer. Additional information may be included, such as CRC information. The control information may also be provided in other formats.

The corresponding original frame is received from the input buffer (320). For example, an output controller may read or request the frame from the input buffer based on the control information. The new header is combined with the frame (324). For example, the new header may be appended to the original frame to encapsulate the original frame for tunneling.

Figure 4:
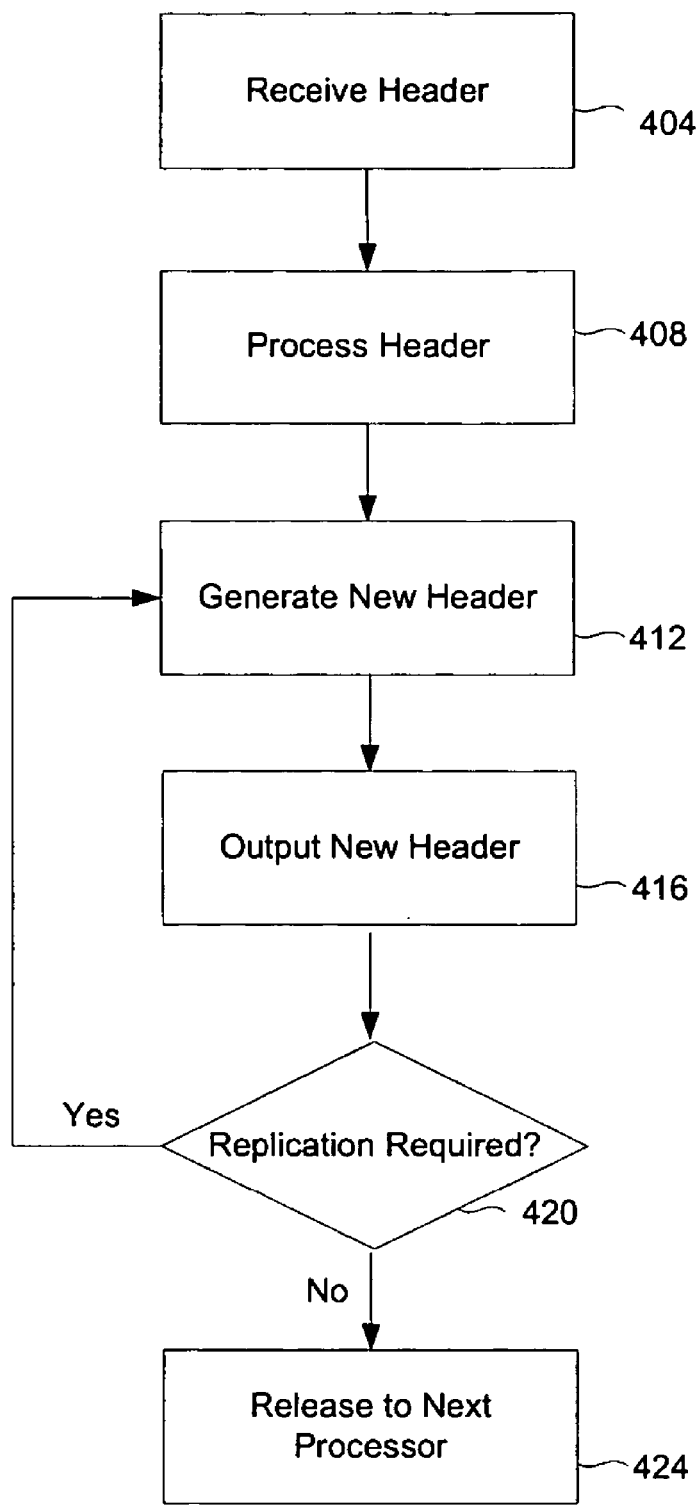
FIG. 4 is a flowchart illustrating a process used in one embodiment to generate multiple output frames based on a single input frame, such as a multicast frame.

FIG. 4 is a flowchart illustrating a process used in one embodiment to generate multiple output frames based on a single input frame, such as a multicast frame. In one embodiment, this process replaces steps 312-316 in FIG. 3. In one embodiment, this process is performed by processor 208 in FIGS. 2A-2B. In one embodiment, the process may be used to generate multiple unique output frames based on a single input frame.

A header is received (404). The header is processed (408). Processing may include reading data from the header, reading data from internal or external memory based on data in the header, or executing software or processing based on or using header data, external data, or internal data. A new header is generated (412). The new header is provided as output (416). For example, the header may be written to an output buffer such as output buffer 280. It is determined whether replication is required (420). The determination may be based on the contents of the frame, header data, or external data. The processor may read, or request and be told whether replication is required. For example, the processor may read header data or external data to determine whether replication is required. If it is determined that replication is not required, processing is released to the next processor. For example, a token may be passed to the next processor indicating that the current processor is finished processing the current frame. The next frame may then be processed by the next processor. If it is determined that replication is required, the process loops back to step 412. Another new header is generated (412) and the process continues as just described. Alternatively, if it is determined that replication is required, the process may loop back to step 408 and further processing required to generate the next new header for the frame is performed. The header is further processed (408) and the process continues as just described. In one embodiment, step 416 of the process shown in FIG. 4 follows step 420, and all of the new headers required for a frame are provided as output only after all of the copies have been generated. In one embodiment, if replication is required one or more of steps 408, 412, and 420 may be performed at the same time that one or more previously-generated new headers are provided as output, as in step 416. For example, generated headers may be provided as output on a rolling basis as they become available to be provided as output, while at the same time further headers may be being generated by the processor.

In one embodiment, the replication process is performed with respect to any given multicast frame by one of processors 261-264 of FIG. 2. During the replication process, while multiple headers are written to output buffer 280 by one processor, the next processor scheduled to write a new header to output buffer 280 is not permitted to output a new header. The next processor waits until the current processor indicates it is finished writing new headers to output buffer 280, or in some embodiments until an arbiter informs the next processor that it may now provide a new header as output. One way this may be done is by passing a token to the next processor. When a processor receives a token, it knows it is its turn to write new headers to output buffer 280.

The order of the steps shown may be altered. For example, determining whether replication is required (420) may occur after receiving the header (404). If it is determined that replication is required, after the new header is generated, the process may loop back to step 408 or 412 to generate another new header.

Figure 5:
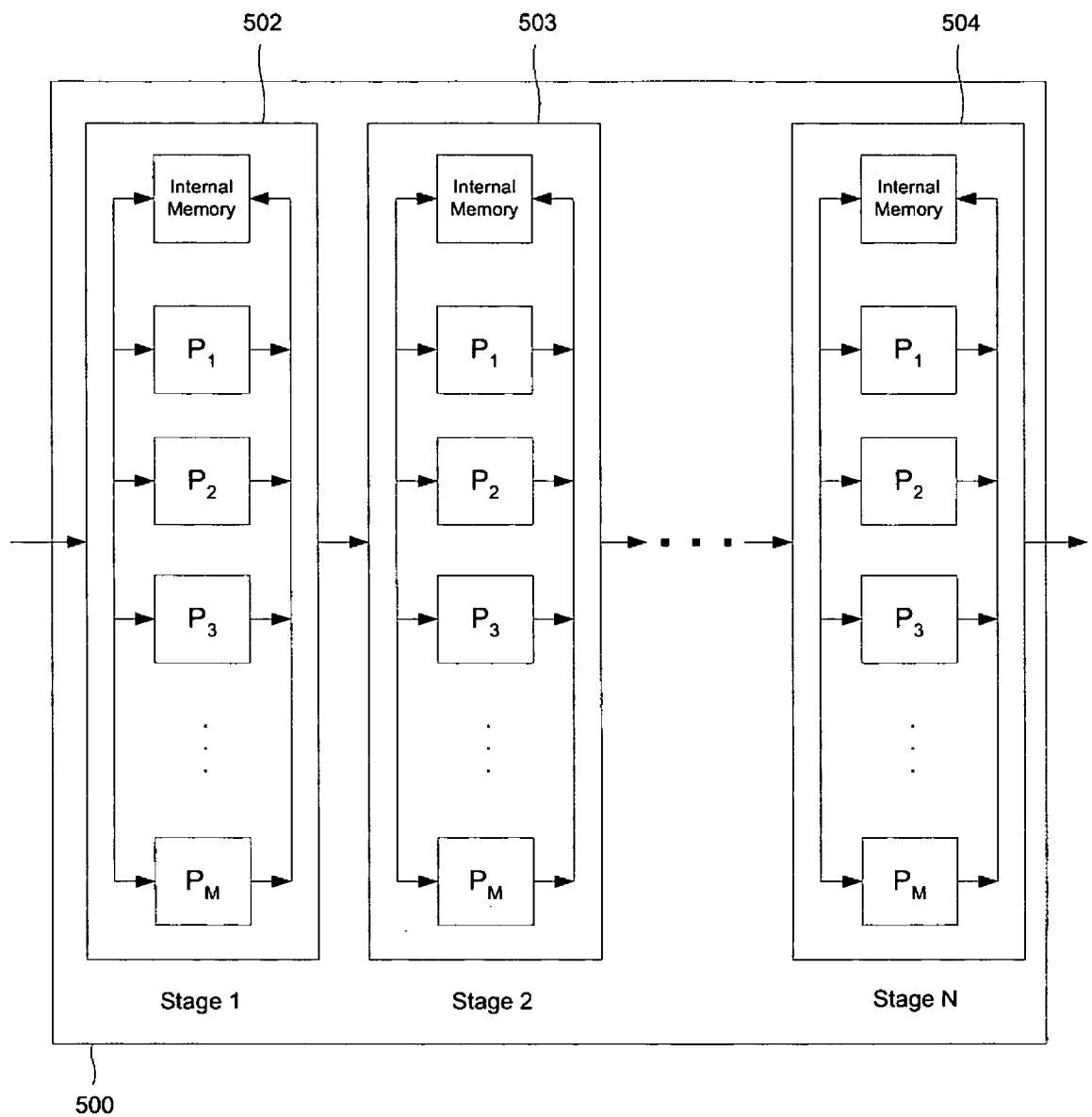
FIG. 5 is a block diagram of a processor comprising an array of M processors each comprising N stages.

In some embodiments, the processor used to process frames may include multiple stages. FIG. 5 is a block diagram of a processor 500 comprising an array of M processors each comprising N stages, the stages 1 to N being represented in FIG. 5 by processor stages 502-504. In one embodiment, processor 500 replaces processor 208 in processing chip 200. Processor 500 includes an array of M×N processors, where M frames are processed in parallel through N stages. Data is shifted between stages according to a processor synchronization scheme. When the processing of each stage is finished, data from stage N is provided as output, data from stage N-1 is shifted to the Nth stage, data from the stage N-2 is shifted to the stage N-1, and so forth. At the input, the next header from the input buffer is shifted to the first stage. In one embodiment, the first stage of processor P1 receives a frame (e.g., by receiving its header and/or associated control information), followed by processor P2, etc., until all M processors of the first stage have received a frame. If there is no input frame, dummy frames or null frames may be inserted at the input to avoid stalling the processing. An arbiter may be used to ensure that all of the processors in a stage are ready to shift before each shift occurs. In one embodiment, there are three stages and ten processors per stage. In one embodiment, a shift occurs every 7-12 clock cycles, and each processor shifts every 70-100 instructions. In one embodiment, the processors of a stage do not shift their frames to the corresponding processor of the next stage simultaneously and instead do so sequentially and in order, so as to maintain packet order. For example, in one embodiment, once the processor P1 of stage N has finished processing a frame and provided one or more associated headers and associated control information as output, the corresponding processor P1 of stage N-1 may shift the frame it has been processing to the processor P1 of stage N, even if the processor P2 of stage N is not yet ready to receive the next frame from its counterpart in stage N-1.

Figure 6:
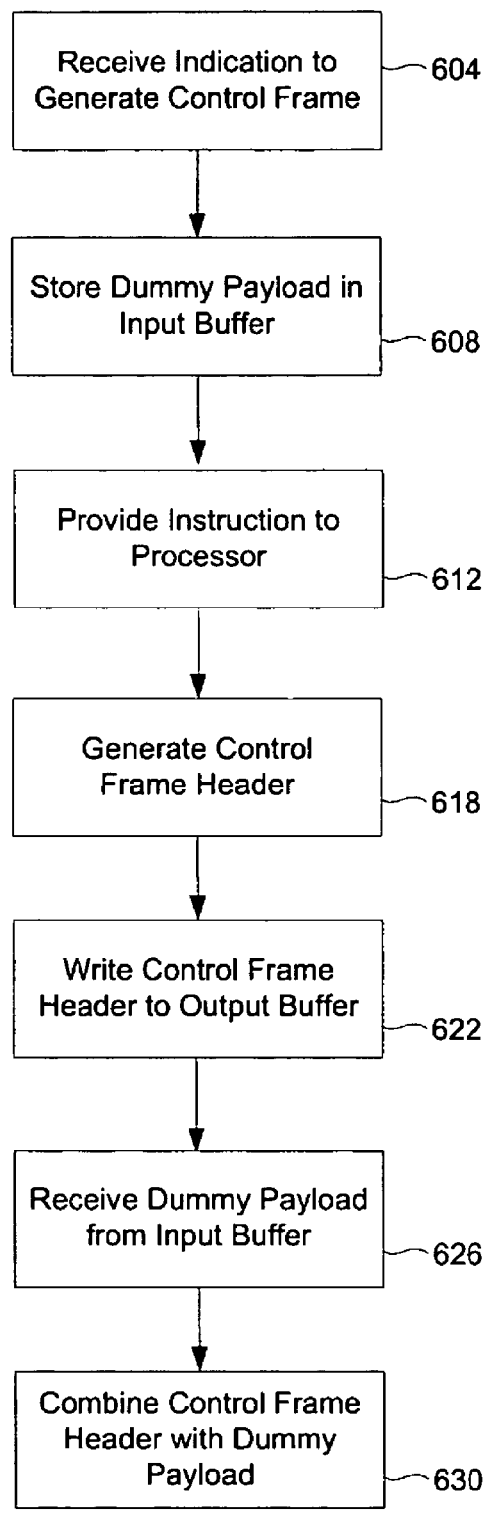
FIG. 6 is a flowchart illustrating a method used in one embodiment to generate a control frame.

In some embodiments, one or more output frames can be generated where no corresponding input frame is available. For example, a control frame may be generated based on time (e.g., a given time of day, periodically, or upon expiration of a timer) or in response to an external input or trigger, such as a CPU request. FIG. 6 is a flowchart illustrating a method used in one embodiment to generate a control frame. In one embodiment, steps 604-612 are performed by input controller 204, steps 618-622 are performed by processor 208, and steps 628-630 are performed by output controller 212. This process can apply to generating a control frame or any type of frame without a corresponding input frame.

An indication to generate a control frame is received (604). For example, an instruction may be sent from a CPU via a CPU interface to an input controller, or a timer may expire, the time of day may correspond to a prescribed time for generating the control frame, etc. A dummy payload or null payload is stored in an input buffer (608). In some embodiments, the input controller generates the dummy payload. An instruction to generate the control frame is provided to a processor (612). For example, the input controller may provide information used by the processor to generate the control frame. In some embodiments, the instruction is provided to the processor in the form of an input header. A control frame header is generated (618). The control frame header is written to an output buffer (626). The control frame header is combined with the dummy payload (630) from the input buffer. For example, the control frame header may be appended to the dummy payload. Alternatively, the dummy payload may be generated by output controller 280 before being combined with the control frame header. The control frame is then provided as output, e.g., to be sent via a switch fabric to a destination to which it is addressed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for generating a plurality of output frames based on a single input frame, comprising:
   an input interface configured to receive at least a portion of individual input frame(s); and
   an output controller configured to:
      if at least a portion of an input frame is received by the input interface and made available for generating output frames, then receive, for each of the plurality of output frames generated from the input frame, a new header and a control information comprising data indicating a specific location within an input buffer in which specific location at least a portion of the input frame received via the input interface is stored, combine each new header with said at least a portion of the input frame to form output frames;
      if no input frame is received by the input interface and made available for generating output frames, then in response to a message, command, or indication received via the input controller, receive one or more new headers and combine each of the one or more new headers with a dummy payload to form one or more output frames;
   wherein the respective new headers are received from a processor included in a multi-processor array comprising a plurality of processors each of at least a subset of which is configured to:
   when receiving a multicast frame, output multiple headers that are required for multicasting the multicast frame and prohibit other processors in the multi-processor array from outputting headers for other frames they are processing until the processor finished generating all of multiple headers required for multicasting the multicast frame; and
   wait to begin processing a next frame header until an indication is received that one or more other processors in the multi-processor array have generated all of one or more copies of headers required for one or more frames that the other processors are currently processing.

2. The system of claim 1, wherein at least one of the new headers is different from at least one other of the new headers.

3. The system of claim 1, wherein each of the new headers is unique.

4. The system of claim 1, wherein two or more of the new headers are the same.

5. The system of claim 1, wherein the at least a portion of the input frame includes a payload.

6. The system of claim 1, wherein the at least a portion of the input frame includes a header and a payload.

7. The system of claim 1, wherein the new header includes at least a portion of a payload.

8. The system of claim 1, wherein the new header includes a header and a payload.

9. The system of claim 1, wherein combining includes appending a new header to the at least a portion of the input frame.

10. The system of claim 1, further comprising a processor configured to process a header associated with the input frame.

11. The system of claim 1, wherein the control information comprises a length value associated with a new header.

12. The system of claim 1, wherein the control information comprises the location of the at least a portion of the input frame by start byte and end byte in a buffer.

13. The system of claim 1, wherein the output controller is configured to receive a control word comprising the control information.

14. The system of claim 1, further comprising an input controller configured to store the at least a portion of the input frame in the input buffer.

15. The system of claim 1, further comprising a buffer configured to receive each new header.

16. The system of claim 1, wherein the output controller is configured to receive the at least a portion of the input frame from where it is stored.

17. The system of claim 1, wherein the output controller is configured to receive the at least a portion of the input frame based on the control information.

18. The system of claim 1, wherein the input frame is one of a plurality of input frames and the multi-processor array is configured to process, for each input frame, data associated with the input frame to generate one or more new headers associated with the input frame.

19. The system of claim 18, further comprising a processor configured to process the headers in parallel.

20. The system of claim 18, further comprising a processor configured to process the headers in stages.

21. The system of claim 18, further comprising a processor configured to shift data from a first processor to a second processor.

22. The system of claim 21, wherein the data is shifted using a synchronization scheme.

23. A method of generating a plurality of output frames based on a single input frame, comprising:
if the portion of input frame is received by an input interface and made available for generating output frames, receiving at an output controller, for each of the plurality of output frames generated from the input frame, a new header and a control information comprising data indicating a specific location within an input buffer in which specific location at least a portion of the input frame is stored, and using the output controller to combine each new header with said at least a portion of the input frame to form output frames; and
if no input frame is received by the input interface and made available for generating output frames, then in response to a message, command, or indication received via the input interface, receiving one or more new headers and using the output controller to combine each of the one or more new headers with a dummy payload to form one or more output frames;
wherein the respective new headers are received from a processor included in a multi-processor array comprising a plurality of processors each of at least a subset of which is configured to:
when receiving a multicast frame, output multiple headers that are required for multicasting the multicast frame and prohibit other processors in the multi-processor array from outputting headers for other frames they are processing until the processor finished generating all the multiple headers required for multicasting the multicast frame; and
wait to begin processing a next frame header until an indication is received that one or more other processors in the multi-processor array have generated all of one or more copies of headers required for one or more frames that the other processors are currently processing.

* * * * *